UNITED STATES PATENT OFFICE.

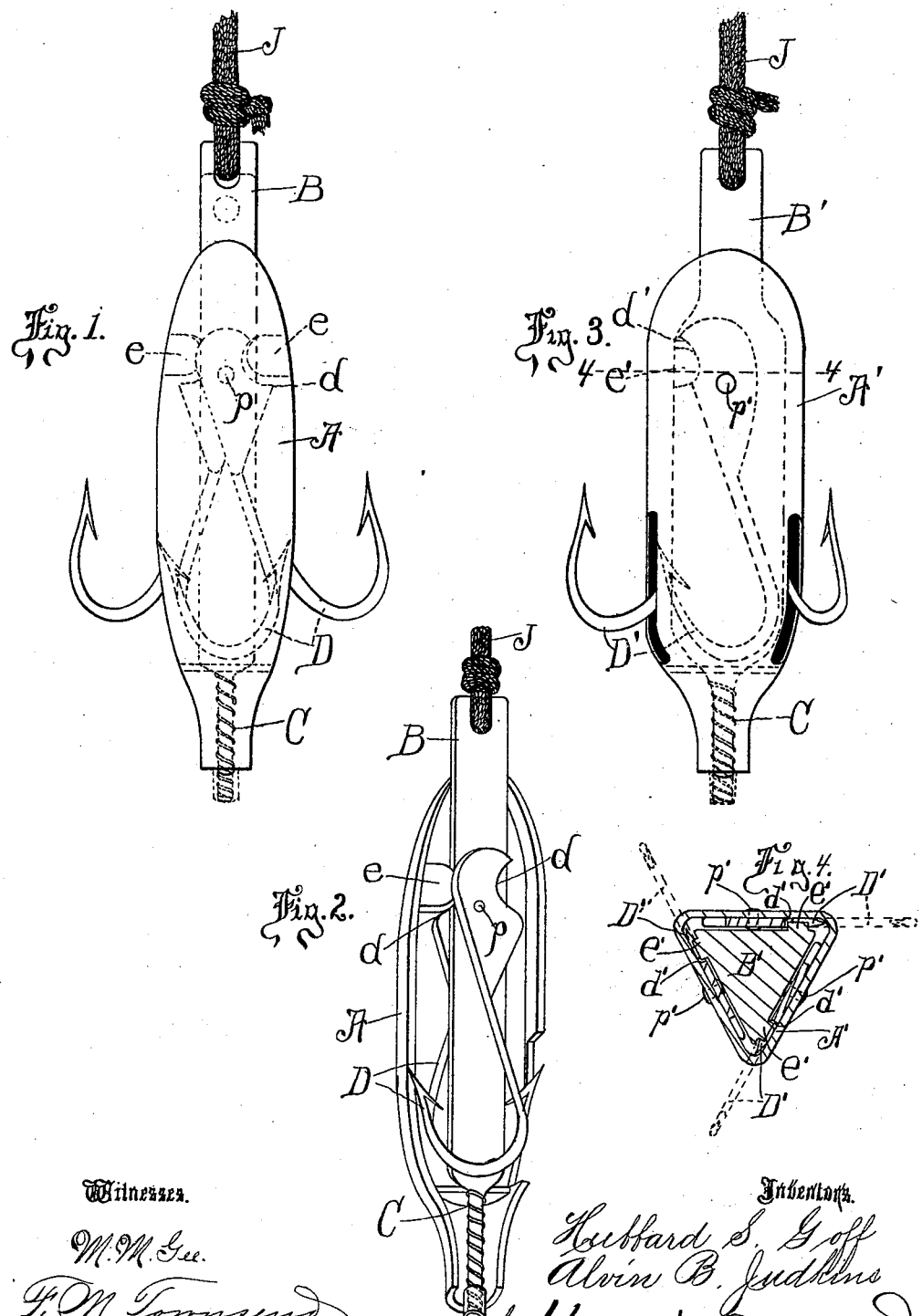

HUBBARD S. GOFF, OF LORDSBURG, AND ALVIN B. JUDKINS, OF LOS ANGELES, CALIFORNIA.

FISH-HOOK.

SPECIFICATION forming part of Letters Patent No. 519,684, dated May 8, 1894.

Application filed December 19, 1892. Serial No. 455,569. (No model.)

*To all whom it may concern:*

Be it known that we, HUBBARD S. GOFF, of Lordsburg, Los Angeles county, and ALVIN B. JUDKINS, of Los Angeles city and county, State of California, citizens of the United States, have invented a new and useful Improved Trolling Device, of which the following is a specification.

Our invention relates to that class of trolling devices in which the points of the hooks are covered except when the device is taken by the fish and in which the hooks are then automatically spread apart to catch the fish.

The object of our invention is to secure great strength together with simplicity of construction and efficiency of action.

Our invention consists essentially in a trolling device of the character specified having its hooks arranged to swing outward at the rear end of the spoon or sheath and having their shanks pivotally secured near the front end of such sheath so that the fish will take the hook well into its mouth before the same is operated to hook the fish and whereby great strength relative to weight of hook will be secured by reason of the slight angle at which the shanks of the hook have to stand with relation to the direction of the strain when the fish is hooked.

By our invention we are enabled to employ fish hooks of the ordinary shape excepting that the end of the shank is enlarged to provide for the pivoting and for the cam face which operates the hook.

The accompanying drawings illustrate our invention.

Figure 1 is a plan view of one form of our improved trolling device showing the hooks extended in solid lines and showing them within the sheath in dotted lines. The sheath is shown retracted to force the hooks out and the dotted lines outside the sheath indicate the position of the line bar when the hooks are retracted. Fig. 2 is a perspective view showing the same form with one side of the sheath removed. Fig. 3 is a side elevation of a triangular form of our invention in which the hooks are pivoted to the sheath instead of being pivoted to the line bar as shown in Figs. 1 and 2. Fig. 4 is a cross-section of Fig. 3 on line $x$—$x$.

Our improved trolling device, consists in the combination of a sheath A (A'), a line bar or center bar B (B') arranged to reciprocate within the sheath, a spring C arranged to retract the line bar toward the rear of the sheath and one or more hooks D (D'') pivotally connected near the end of its shank with the bar or with the sheath, as either is used, and provided with a suitable engaging cam face $d$ adapted and arranged to engage a suitable hook operating cam projection $e$ arranged upon and fixed to the sheath or to the line bar, as either is used, to engage the hook to extend and retract it laterally; (that is to say, if the hook is pivoted to the line bar, its engaging face $d$ is adapted and arranged to engage a projection $e$ upon the sheath, and vice versa, it being immaterial whether the hooks are pivoted to the line bar or to the sheath,) and such cam projection fixed to the sheath or line bar as the case may be. The hook operating projection is fixed to the line bar if the hook is pivoted to the sheath. The action of the hooks, however, is slightly different when pivoted to the sheath from what it is when pivoted to the line bar. When the hooks are pivoted to the line bar they move forward and outward with relation to the sheath when the hook is operated, and they only move outward with relation to the sheath when they are pivoted to the sheath.

In Figs. 1 and 2 the hooks are shown pivoted to the line bar by pivot $p$, and the hook operating projections or lugs $e$ form a part of the sheath, which is flat, and but two hooks are provided arranged to extend laterally from the edge of the sheath when the same is drawn back toward the rear of the line bar.

In the form shown in Figs. 3 and 4 the sheath is triangular and is provided with three hooks D' which are pivoted to the inside walls of the sheath, by pivot $p'$ while the hook engaging lugs $e'$ form a part of the line bar B'. The sheath in each form is made of bright metal, such as iron galvanized to attract the attention of the fish. Or it may be of bone, pearl or other suitable material.

In practice the operation is as follows:— The trolling device is thrown into the water and trolled with in the ordinary manner, the spring C holding the hooks in their retracted position so that they will not catch upon anything. When the fish attracted by the bright sheath bites the same, it pulls the sheath back along the line bar against the action of the spring, and the lugs *e* or braces *h* operate upon the hooks to force them into their extended position to engage the mouth of the fish. The number of hooks is immaterial except that where the number is increased the efficiency is also increased, but the action is the same whether one or more hooks are used or whether the hooks are pivoted to the line bar or to the sheath.

In the drawings J indicates the line attached to the line bar.

We prefer to pivot the hook to the line bar and to adapt the cam projection to the sheath but we desire to claim the one or the other form as either is used because both are interchangeably valuable for the specified purpose. We also desire our claim to cover the device, whether one, two or more hooks are employed.

Now, having described our invention, what we claim as new, and desire to secure by Letters Patent, is—

The combination of the sheath; the line bar arranged to reciprocate within the sheath; the spring arranged to retract the line bar toward the rear of the sheath; the hook arranged to swing outward at the rear end of the sheath and pivotally connected near the head of its shank with the bar, and provided at its shank end with a suitable cam face adapted and arranged to engage a suitable cam projection arranged upon the sheath and such cam projection fixed to the sheath and arranged to engage the cam face of the shank of the hook.

HUBBARD S. GOFF.
ALVIN B. JUDKINS.

Witnesses as to the signature of Hubbard S. Goff:
JAMES R. TOWNSEND,
L. J. GOFF.

Witnesses as to the signature of Alvin B. Judkins:
J. L. GAULDIN,
ALFRED I. TOWNSEND.